United States Patent

[11] 3,555,185

[72] Inventors Ole Skrydstrup
Pierrefonds;
Bjorn Larsen, Pointe Claire, Quebec, Canada
[21] Appl. No. 695,976
[22] Filed Jan. [illegible], 1968
[45] Patented Jan. 12, 1971
[73] Assignee Central Dynamics, Ltd.
Pointe Claire, Montreal, Quebec, Canada
a body corporate and politic

[54] SYNCHRONIZING PULSE COMPARATOR CIRCUITRY
8 Claims, 2 Drawing Figs.

[52] U.S. Cl. .......... 178/69.5, 328/133
[51] Int. Cl. .......... H04n 1/36, H03d 13/00, H03k 5/18
[50] Field of Search .......... 178/69.5, 69.5TV, 69.5DC; 328/134, 139, 141, 72, 155, 133; 307/208, 269, 232; 179/15SYNC

[56] References Cited
UNITED STATES PATENTS

| | | | |
|---|---|---|---|
| 2,858,425 | 10/1958 | Gordon | 328/134 |
| 3,058,063 | 10/1962 | Sher | 328/134 |
| 3,265,974 | 8/1966 | Thomas | 328/63 |
| 3,430,148 | 2/1969 | Miki | 328/155 |

*Primary Examiner*—Richard Murray
*Assistant Examiner*—George G. Stellar
*Attorney*—Addams and Ferguson

ABSTRACT: A circuit for comparing two trains of synchronizing pulses is disclosed wherein the circuitry determines whether the time displacement between the trains is within a predetermined limit, the limit being adjustable. The above circuit comprises a comparator to which is applied the two pulse trains. The output of the comparator is a pulse whose width is a direct function of the displacement. This pulse is applied to an invertor and a monostable multivibrator, the pulse width of which is adjustable. The monostable multivibrator output and the invertor output are applied to a bistable multivibrator. The positive-going, leading edge of the monostable multivibrator output sets the bistable multivibrator and the positive-going, trailing edge of the invertor output pulse resets the bistable multivibrator. The output pulses of the monostable and bistable multivibrator are applied to a second comparator which generates an output alarm signal whenever the bistable multivibrator output signal is greater in time duration than the monostable multivibrator output signal. The occurence of an alarm signal at the output of the second comparator indicates that the time displacement between the pulse trains is greater than the predetermined limit established by the adjustable pulse width of the monostable multivibrator output signal. The second comparator output signal is applied to a second monostable multivibrator which detects the occurrence of an output signal from the second comparator even though the width pulse thereof is very slight. The second monostable multivibrator output signal is then applied to an integrator which provides an output signal only after a predetermined number of pulses of the two trains are out of synchronization. The integrator output signal is then applied to an appropriate control device.

INVENTORS
OLE SKRYDSTRUP
BJORN LARSON
BY Gerald J. Ferguson, Jr.
ATTORNEY

INVENTORS
OLE SKRYDSTRUP
BJORN LARSON

BY Gerald J. Ferguson Jr.
ATTORNEYS

SYNCHRONIZING PULSE COMPARATOR CIRCUITRY

CROSS-REFERENCE TO RELATED APPLICATION

A portion of the circuitry employed in this invention is also utilized in the copending application Ser. No. 653,596 filed Jun. 28th 1967 abandoned, by Ole Skrydstrup entitled "Electronic Tally Circuitry."

BACKGROUND OF THE INVENTION

This invention relates to circuitry for comparing two pulses or continuous trains thereof to determine whether the two pulses or trains thereof are in time displacement from one another by more than a predetermined adjustable amount.

A typical application of the above invention arises in television programming where the television transmitting station local synchronizing generator is employed as a standard and where the synchronizing pulses of the video signal are separated therefrom and compared with the standard to determine whether the time phase of the sync pulses of the video signal falls within permissible limits.

Prior art circuitry for accomplishing the above function typically employs a comparator to which the two pulse trains are applied, a comparator output signal occuring whenever there is a lack of time coincidence between the pulse trains. The comparator output signal is then applied directly to an integrator which stores the time displacement indication. However, it can be seen that there is no provision for adjustment of the limit beyond which the pulses are considered nonsynchronous.

Examples of prior U.S. patents which are concerned with the problem of determining the relative time relation between two pulses trains are U.S. Pat. Nos. 3,265,974 (R. Thomas) and 3,143,666 (D. Aaronson). An inspection of these patents will readily reveal that they do not disclose the approach of the instant invention.

SUMMARY

The objects of the present invention are as follows:

1. The provision of synchronizing pulse comparator circuitry, the circuit being adjustable so that the permissible phase or time difference between the pulse trains is adjustable.
2. The provision of circuitry of the above type wherein the comparison of the relative pulse timing of the two trains is highly accurate, and;
3. The provisions of circuitry of the above type wherein a signal indicative of a nonsynchronous condition between the two pulse trains is generated even though the lack of synchronism is only occasional in a large number of pulses.

Other objects and advantages of the invention will become more apparent from a reading of the following detailed description of an invention, together with the appended claims and illustrative embodiment of the drawing.

DESCRIPTION OF A PREFERRED EMBODIMENT OF THE INVENTION

As stated herein before this invention compares two pulses or continuous trains of pulses to determine whether the pulses or trains are synchronous or nonsynchronous. For the purposes of the specification and claims, the pulses or trains are considered synchronous if the time displacement of the respective pulses is less than a predetermined value and are considered nonsynchronous if the time displacement is greater than that value.

Figure 1:
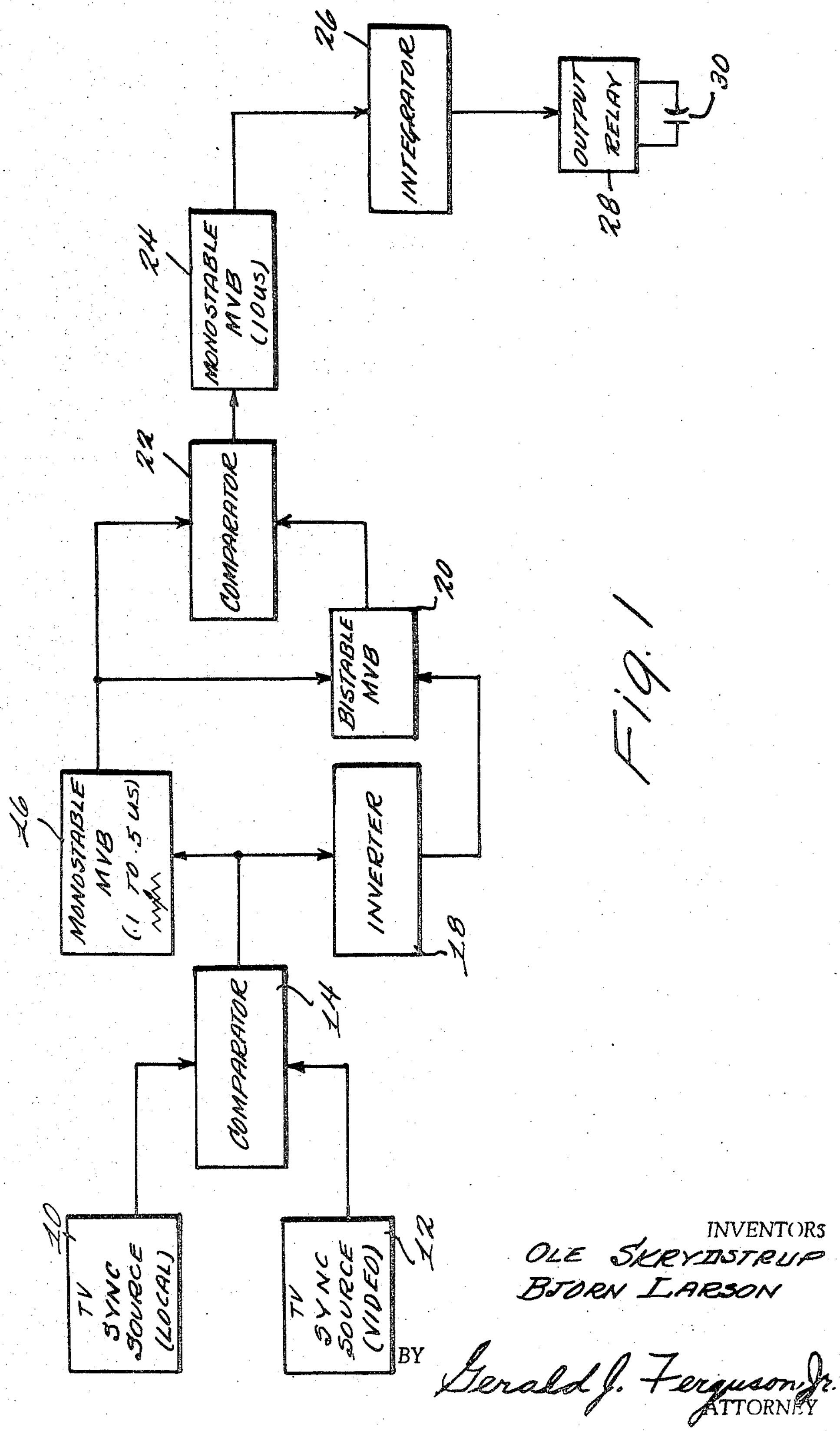
FIG. 1 is a block diagram of an illustrative embodiment of the invention.
Figure 2:
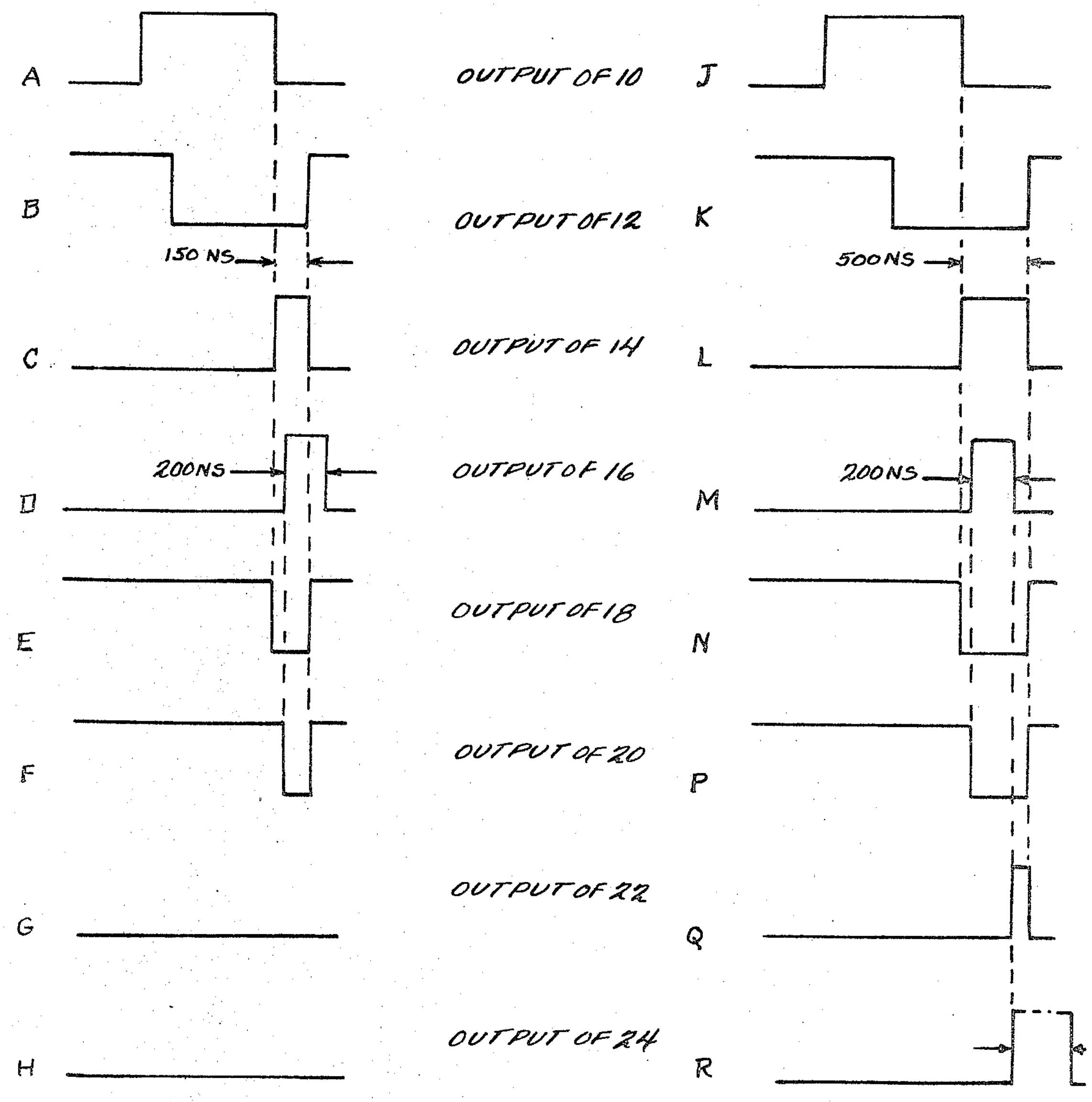
FIGS. 2A through 2R illustrates various typical waveforms which may occur in the circuitry of FIG. 1.

Referring to FIG. 1 there are shown two sources 10 and 12 of synchronous pulses. Source 10 may be a television station local generator while source 12 may be synchronous pulses which have been separated from a video signal. As can be seen in FIGS. 2A and 2B, these two sources respectively produce positive and negative-going signals which are applied to a first comparator 14, which produces an output signal whenever there is lack of phase or time coincidence between the two output signals applied thereto. Hence, comparator 14 converts the time displacement between the pulses from sources 10 and 12 to a variable width pulse, the width of which is substantially equal to the time displacement. The detailed circuitry for accomplishing the comparator 14 function would be obvious to one of ordinary skill in the art of pulse and digital circuitry. For example, a circuit such as disclosed in the text, PULSE, DIGITAL, AND SWITCHING WAVEFORMS by Jacob Millman and Herbert Taub, published by McGraw-Hill Book Co., copyright Sept. 17, 1965, pages 333—334, would readily accomplish the function of comparator 14.

The output from comparator 14 is applied to a first monostable multivibrator 16 and invertor 18. The pulse width of the monostable multivibrator output signal is adjustable over a typical range of 100 to 500 nanoseconds. A typical adjustable, monostable multivibrator for use with this invention may be found in the before-mentioned text, PULSE, DIGITAL, AND SWITCHING WAVEFORMS, pages 405-—408. It is this pulse width which determines the permissible time displacement between the two pulses of sources 10 and 12. The output signal from multivibrator 16 and invertor 18 are applied to bistable multivibrator 20, these two output signals being shown in FIGS. 2D and 2E and the comparator 14 output signal being shown in FIG. 2C. The positive-going leading edge of the multivibrator 16 output signal sets bistable multivibrator 20 and the positive-going trailing edge of the invertor 18 output signal resets the multivibrator 20. A typical bistable multivibrator which may be employed in the invention is found in the before-mentioned text, PULSE, DIGITAL, AND SWITCHING WAVEFORMS, pages 383—385. Since the output from multivibrator 16 is slightly delayed by a few nanoseconds with respect to the invertor 18 output signal, the pulse width of the multivibrator 20 output signal is slightly less than the predetermined pulse width of the multivibrator 16. Thus, the width of the multivibrator 20 signal is substantially equal to the time displacement between the pulses provided by sources 10 and 12.

Applied to a second comparator 22 are the output signals from monostable multivibrator 16 and bistable multivibrator 20. Comparator 22 operates exactly the same as the first comparator 14, as will become evident hereinafter, and thus the comparator circuit 22 may also be constructed in the manner hereinbefore stated for comparator 14. Comparator 22 produces an output signal whenever the time displacement between the pulses from sources 10 and 12 is greater than predetermined value established at monostable multivibrator 16.

The output from comparator 22 is applied to a second monostable multivibrator 24, the purpose of which is to determine the presence of comparator 22 output pulses no matter how small in width these pulses are. The monostable multivibrator 24 may be constructed in the same manner as that disclosed hereinbefore for multivibrator 16; however, of course, there is no need for effecting adjustability of multivibrator 24 as is the case with multivibrator 16. Integrator 26 is responsive to the second multivibrator 24. This integrator is optional and may be used to determine whether a given number of pulses over a predetermined time interval are nonsynchronous as established by the time constant of the integrator 26. The charge time constant of integrator 26 is preferably so chosen that a nonsynchronous condition must be detected in at least four to ten consecutive pulse-by-pulse comparisons in order to energize the relay 28. Further, the discharge time constant of integrator 26 is preferably so chosen that if such a series of consecutive time differences is detected only once in every 525 comparisons, the relay 28 remains energized. Output relay 28 is responsive to integrator 26 to control an appropriate device. In general, output relay 28 provides one output signal to indicate the synchronous condition and another to indicate the nonsychronous conditions. Comparator 30 is connected in parallel with the coil of relay 28 to insure that the relay remains energized for approximately 3 seconds after a "nonsynchronous" decision. This allows time for stabilization of subsequent equipment such as video tape recorders. Of course, other appropriate control devices may be employed in the place of relay 28.

The operation of the circuitry of FIG. 1 will now be described. Reference should now be made to FIGS. 2A—2H which illustrate typical wave forms which occur in the block diagram of FIG. 1. When the synchronizing pulse from source 10 occurs 150 nanoseconds before the corresponding synchronizing pulse from source 12 and assuming that the monostable multivibrator is adjusted to provide a 200 nanosecond pulse, it will now be shown that an alarm signal will not appear at the output of comparator 22 since the time deviation or displacement between the pulses from sources 10 and 12 is less than the predetermined value established at multivibrator 16. The 150 nanosecond time difference is shown in FIGS. 2A and 2B. The 150 nanosecond output pulse from comparator 14 is shown in FIG. 2C and it can now be clearly seen how comparator 14 acts as a means for converting the time difference between the pulses from sources 10 and 12 to a pulse, the width of which substantially equals the time difference. The leading edge of the comparator 14 output pulse triggers monostable multivibrator 16 to thereby produce a pulse of 200 nanoseconds duration as shown in FIG. 2D. This pulse is slightly delayed by a few nanoseconds because of the inherent inertia of multivibrator 16. The comparator 14 output pulse immediately passes through the invertor 18 as shown in FIG. 2E. The positive-going leading edge of the multivibrator 16 output signal sets multivibrator 20 as shown in FIG. 2F and it is reset by the positive-going, trailing edge of the invertor 18 output signal, The output signals from monostable 16 and bistable multivibrators 20 are both applied to comparator 22. Both of these signals commence at the same time as shown by a comparison of FIGS. 2D and 2F. As stated hereinbefore, the pulse width of the output signal from multivibrator 20 is slightly less than the pulse width of the comparator 14 output signal. Thus, the pulse width of the multivibrator 20 signal is slightly less than 150 nanoseconds. However, it remains substantially equal to the time difference between the pulses from sources 10 and 12.

There is no output signal from comparator 22 since the duration of the multivibrator 20 signal is less than the duration of the monostable multivibrator 16 signal. Thus, in FIGS. 2G and 2H no output signal is indicated thereby establishing that comparator 22 does not generate an output signal whenever the time difference between the pulse trains applied to comparator 14 is less than the pulse duration of the output signal from multivibrator 16.

Assume that the setting of monostable multivibrator 16 remains the same as before while the timing difference or displacement between the respective pulses applied from sources 10 and 12 becomes 500 nanoseconds with the output of source 10 leading that of source 12. Thus, comparator 14 generates a 500 nanosecond pulse as shown in FIG. 2L. Monostable multivibrator 16 again generates a 200 nanosecond pulse as shown in FIG. 2M. Bistable multivibrator 20 generates a pulse, the duration of which is slightly less than 500 nanoseconds but which is substantially more than the 200 nanosecond pulse from multivibrator 16. Thus, that portion of the multivibrator 20 output signal which is negative and which does not occur in time coincidence with the multivibrator 16 signal produces a pulse from comparator 22 as shown in FIG. 2Q, which is 300 nanoseconds long. The leading edge of the comparator 22 signal triggers second monostable multivibrator 24 which, in turn, generates a 10 microsecond signal as shown in FIG. 2R. Thus, it can now be seen how this second multivibrator 24 insures detection of a nonsynchronous condition even though the time displacement between the pulse trains applied to comparator 14 is very small—that is, even though the pulse width of the comparator 22 signal is very narrow, this signal will still be of sufficient amplitude and duration to trigger multivibrator 24 and generate the 10 microsecond signal which can be readily detected. This signal may be employed in many different ways, one of which has already been suggested hereinbefore. Further, the absence of monostable multivibrator 24 can result in failure to maintain relay 28 energized if an output signal occurs only occasionally during the above-mentioned period of 525 pulse-by-pulse comparisons.

The role of multivibrator 20 is particularly important inasmuch as it insures time coincidence of the leading edge of the two signals applied to comparator 22. In the absence of multivibrator 20, the output of invertor 18 would be applied directly to comparator 22, however because of the delay in the output signal from multivibrator 16, there would occur a spike in the output of comparator 22 until the multivibrator 16 output rose to a sufficient level. This spike would result in a false nonsynchronous indication by relay 28.

From the foregoing description of the operation, it is clear that substantial time coincidence is necessary both at the leading and trailing edges of the synchronous pulses applied from source 10 and 12 if relay 28 is to remain deenergized.

Numerous modifications of the invention will become apparent to those of ordinary skills in this art. It is to be understood, however, that the foregoing disclosure is to be considered exemplary and not limitative.

We claim:

1. Pulse comparator circuitry for detecting a nonsynchronous condition between at least two pulses of equal width, said circuitry comprising:

first comparator means responsive to said two pulses for generating a first comparator means output pulse the width of which approximately equals the time displacement between said two pulses;

monostable means responsive to the comparator output pulse for generating a monostable means output pulse, the pulse width of which establishes the greatest detectable time difference between said two pulses;

bistable means responsive to the output pulses from said monostable means and said first comparator means for producing a bistable means output pulse, the leading edge of which is in substantial time coincidence with the leading edge of the monostable means output signal and the width of which approximately equals said time difference between the leading edges of said two pulses of equal width and;

second comparator means responsive to the output pulses from said first monostable means and said bistable means for generating an alarm signal indicative of said nonsynchronous condition whenever the width of the bistable means output pulse is greater than the width of the monostable means output pulse.

2. Circuitry as in claim 1 where said monostable means includes means for adjusting the width of its output signal.

3. Circuitry as in claim 2 including invertor means responsive to said first comparator means output pulse for developing one of the two signals applied to said bistable means.

4. Circuitry as in claim 3 where said bistable means is set by the leading edge of said monostable means output signal and it is reset by the trailing edge of said invertor means output signal.

5. Circuitry as in claim 1 including second monostable means for detecting the presence of said alarm signal from said second comparator means no matter how slight the width of said alarm signal and for generating a signal of sufficient width to insure detection thereof.

6. Circuitry as in claim 1 where one of said two pulses is one of a train of television synchronizing pulses generated by a standard clock source and where the other is one of a train of television synchronizing pulses separated from a video signal.

7. Circuitry as in claim 6 including integrator means for detecting the presence of a predetermined number of said alarm signals over a predetermined period of time.

8. Circuitry as in claim 1 where one of said two pulses is one of a first train of television synchronizing pulses separated from a first video signal and where the other is one of a second train of television synchronizing pulses separated from a second video signal.